US009823795B2

(12) United States Patent
Chu et al.

(10) Patent No.: US 9,823,795 B2
(45) Date of Patent: Nov. 21, 2017

(54) TOUCH SUBSTRATE (71) Applicant: INNOLUX CORPORATION, Jhu-Nan, Miao-Li County (TW)

(72) Inventors: Chih-Ta Chu, Jhu-Nan (TW); Chia-Hsiung Chang, Jhu-Nan (TW); Yang-Chen Chen, Jhu-Nan (TW)

(73) Assignee: INNOLUX CORPORATION, Jhu-Nan (TW)

( * ) Notice: Subject to any disclaimer, the term of this patent is extended or adjusted under 35 U.S.C. 154(b) by 226 days.

(21) Appl. No.: 14/727,729

(22) Filed: Jun. 1, 2015

(65) Prior Publication Data
US 2016/0124543 A1 May 5, 2016

(30) Foreign Application Priority Data
Nov. 4, 2014 (TW) .............................. 103138250 A (51) Int. Cl.
*G06F 3/044* (2006.01)
(52) U.S. Cl.
CPC .... *G06F 3/044* (2013.01); *G06F 2203/04111* (2013.01)
(58) Field of Classification Search
CPC ................. G06F 2203/04111; G06F 3/044
USPC .................................................. 345/170–176
See application file for complete search history.

(56) References Cited

U.S. PATENT DOCUMENTS

2015/0009422 A1* 1/2015 Tung ....................... G06F 3/044
349/12
2015/0220200 A1* 8/2015 Kim ...................... G06F 3/0412
345/174

FOREIGN PATENT DOCUMENTS

TW 201112085 4/2011
TW 201342442 10/2013

* cited by examiner

*Primary Examiner* — Tony Davis
(74) *Attorney, Agent, or Firm* — Liu & Liu (57) ABSTRACT

A plurality of first touch patterns of a touch substrate are disposed separately and disposed on the substrate along a first direction. A plurality of second touch patterns are separated from each other and disposed on the substrate along a second direction and interlace with the first touch patterns. One of the first touch patterns includes a plurality of first main portions extended along the second direction, a plurality of branch portions connected to the first main portions and extended along the first direction, and a plurality of first protruding portions connected to the branch portions and extended along the second direction. The first main portions and the first protruding portions are respectively disposed on two ends of the branch portions. The branch portion includes a middle section and two extending sections, and the minimum width of the middle section is less than that of the extending sections.

10 Claims, 12 Drawing Sheets

TOUCH SUBSTRATE

CROSS REFERENCE TO RELATED APPLICATIONS

This Non-provisional application claims priority under 35 U.S.C. §119(a) on Patent Application No(s). 103138250 filed in Taiwan, Republic of China on Nov. 4, 2014, the entire contents of which are hereby incorporated by reference.

BACKGROUND OF THE INVENTION

Field of Invention

The invention relates to a touch substrate and, in particular, to a touch substrate with a higher sensing sensitivity.

Related Art

With the progress of technologies, touch control technique has been widely applied to various electronic devices. Because the user can execute the functions by just touching the display image displayed by the touch display device, the operational complexity is largely reduced and the touch display device is thus getting more and more popular to the consumers.

Figure 1:
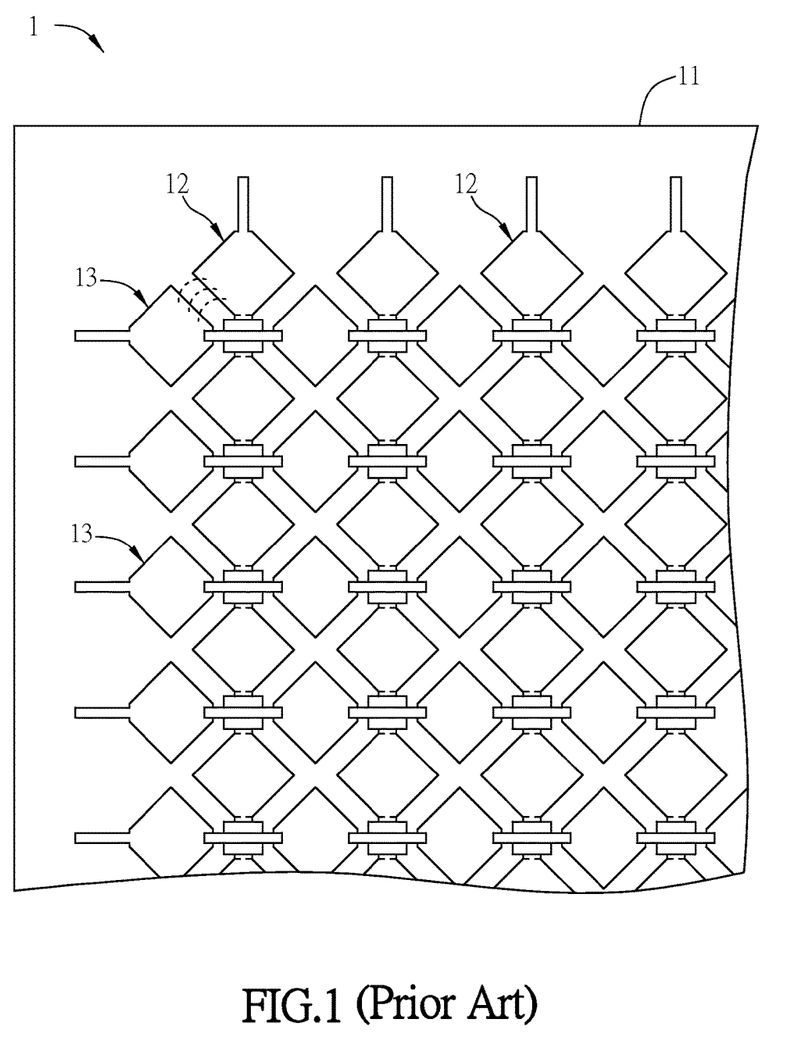
FIG. 1 is a schematic diagram of a conventional touch substrate.

FIG. 1 is a schematic diagram of a conventional touch substrate 1.

As shown in FIG. 1, the touch substrate 1 includes a touch sensing structure electrically connected to a touch control circuit board. The touch sensing structure generally includes a plurality of driving electrodes 12 (so-called Tx) and a plurality of sensing electrodes 13 (so-called Rx) which are both disposed on a substrate 11. The touch sensing structure can generate the touch signal when touched by the user, and then the touch signal will be sent to the touch control circuit board and thereby a corresponding control operation can be generated.

However, the driving electrodes 12 and sensing electrodes 13 of the conventional touch substrate 1 are shaped like a diamond and therefore will be limited in their sensing paths and ranges (such as less sensible area). As a result, the sensing sensitivity of the touch substrate 1 will be diminished.

Therefore, it is an important subject to provide a touch substrate which is configured with a higher sensing sensitivity.

SUMMARY OF THE INVENTION

In view of the foregoing subject, an objective of the invention is to provide a touch substrate which is configured with a higher sensing sensitivity.

To achieve the above objective, a touch substrate according to the invention comprises a substrate, a plurality of first touch patterns and a plurality of second touch patterns. The first touch patterns are separated from each other and disposed on the substrate along a first direction. The second touch patterns are separated from each other and disposed on the substrate along a second direction, and interlace with the first touch patterns. One of the first touch patterns includes a plurality of first main portions, a plurality of branch portions and a plurality of first protruding portions. The first main portions are extended along the second direction and electrically connected to each other. The branch portions are connected to the first main portions and extended along the first direction. The first protruding portions are connected to the branch portions and extended along the second direction. The first main portions and the first protruding portions are respectively disposed on two ends of the branch portions. One of the branch portions includes a middle section and two extending sections, the two extending sections are disposed on two ends of the middle section and connected to the corresponding first main portion and first protruding portion, respectively, and the minimum width of the middle section is less than that of the two extending sections.

In one embodiment, the second touch patterns include a plurality of second main portions and a plurality of second protruding portions. The second main portions are extended along the first direction and electrically connected to each other. The second protruding portions protrude from the second main portions, and the shape of one of the second protruding portions corresponds to the shape of the branch portion of the first touch pattern which is disposed adjacent to the one of the second protruding portions.

In one embodiment, an interval between the adjacent first protruding portions of the adjacent first touch patterns at a middle part of the adjacent first protruding portions is less than that at an end part of the adjacent first protruding portions.

In one embodiment, the shape of one end of each of the first protruding portion and the second protruding portion along the second direction is taper, rectangular or arc.

In one embodiment, the first main portions are separated from each other, the first touch patterns further include a plurality of bridge portions and a plurality of insulating layers, one of the bridge portions connects the two adjacent first main portions, and the insulating layers are disposed between the bridge portions and the second touch patterns.

In one embodiment, the second main portions are separated from each other, the second touch patterns further include a plurality of bridge portions and a plurality of insulating layers, one of the bridge portions connects the two adjacent second main portions, and the insulating layers are disposed between the bridge portions and the first touch patterns.

In one embodiment, the shape of one of the first protruding portions corresponds to the shape of the second main portion which is disposed adjacent to the one of the first protruding portions.

In one embodiment, the first protruding portion is disposed between the adjacent second protruding portions.

In one embodiment, the touch substrate further comprises a plurality of dummy electrodes disposed between the first touch patterns and the second touch patterns.

In one embodiment, the touch substrate is applied to an out-cell touch display device or an on-cell touch display device.

As mentioned above, in the touch substrate of this invention, the first touch patterns and the second touch patterns are designed in the shape and arrangement, one of the branch portions of the first touch patterns includes a middle section and two extending sections, the two extending sections are disposed on the two ends of the middle section and connected with the corresponding first main portion and first protruding portion, respectively, and the minimum width of the middle section is less than that of the two extending sections. Therefore, in comparison with the touch pattern of the conventional touch substrate, the sensing path and range can be extended between the first touch patterns and second touch patterns of the touch substrate of the invention, and the sensing sensitivity can be thus enhanced.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 2A:
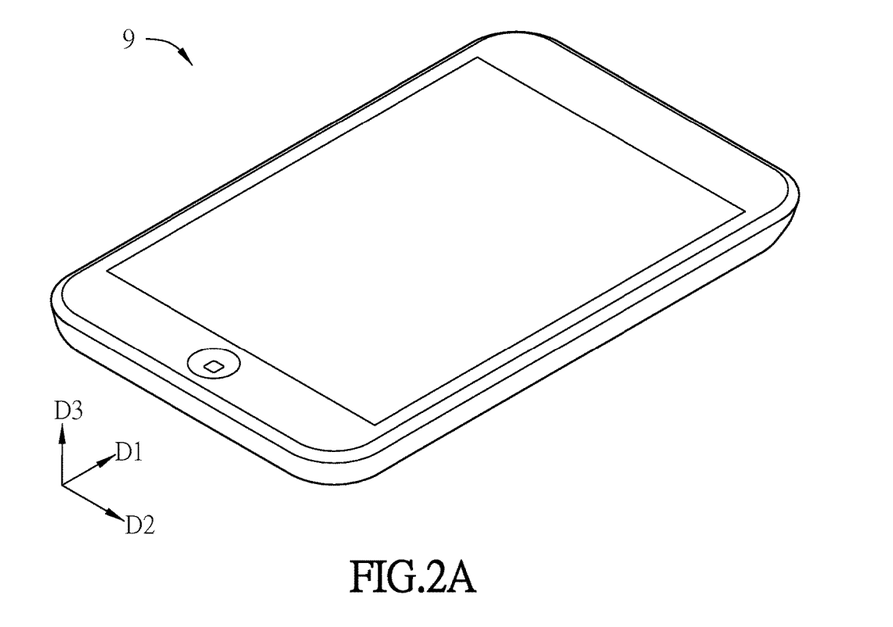
FIG. 2A is a schematic diagram of a touch display device.
Figure 2B:
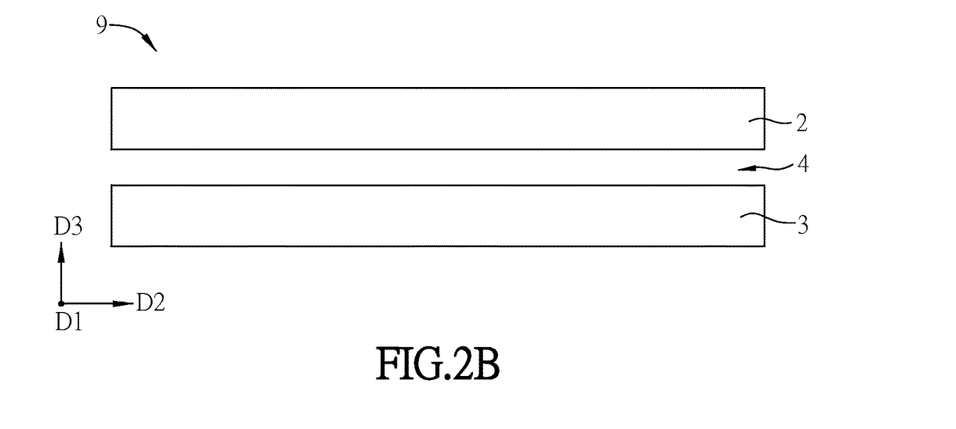
FIG. 2B is a schematic side view of the touch display device of FIG. 2A.
Figure 2C:
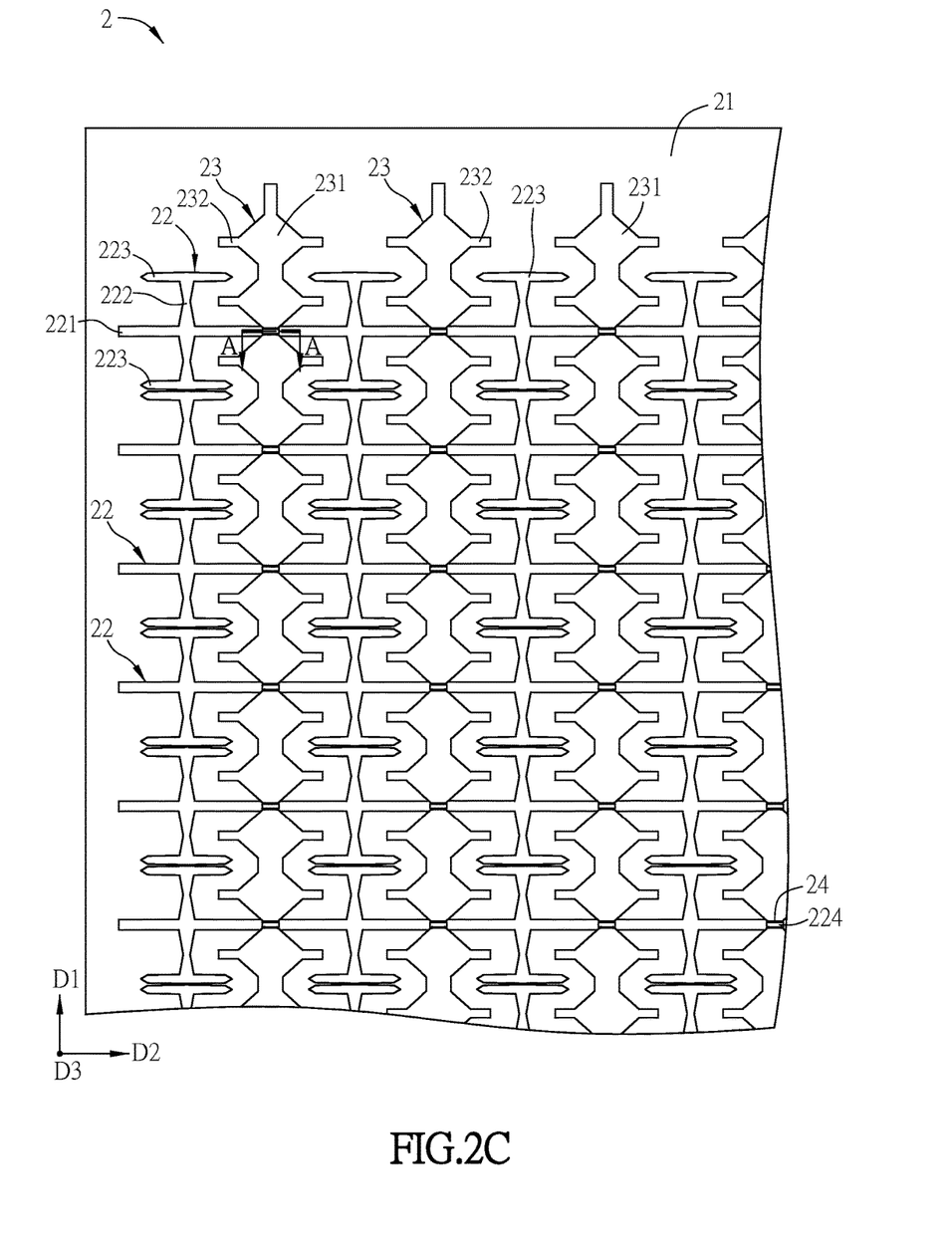
FIG. 2C is a schematic top view of the touch substrate of the touch display device of FIG. 2B.
Figure 2D:
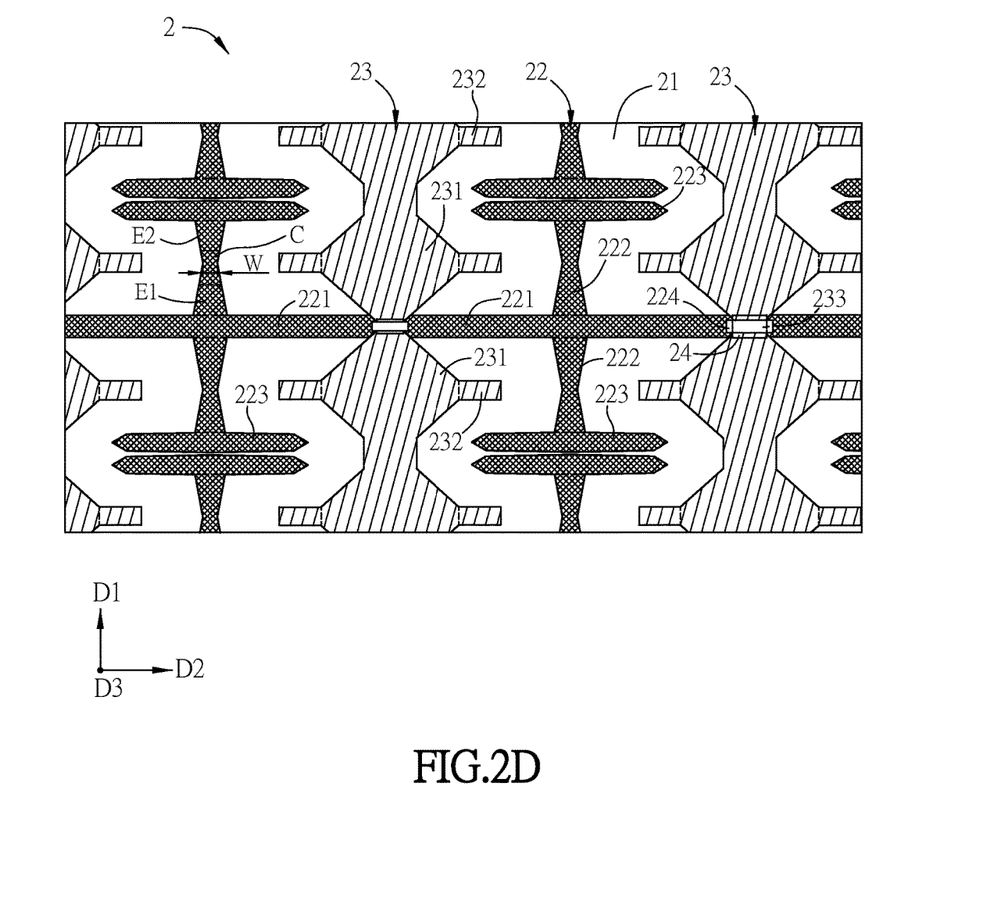
FIG. 2D is a schematic enlarged diagram of a part of FIG. 2C.
Figure 2E:
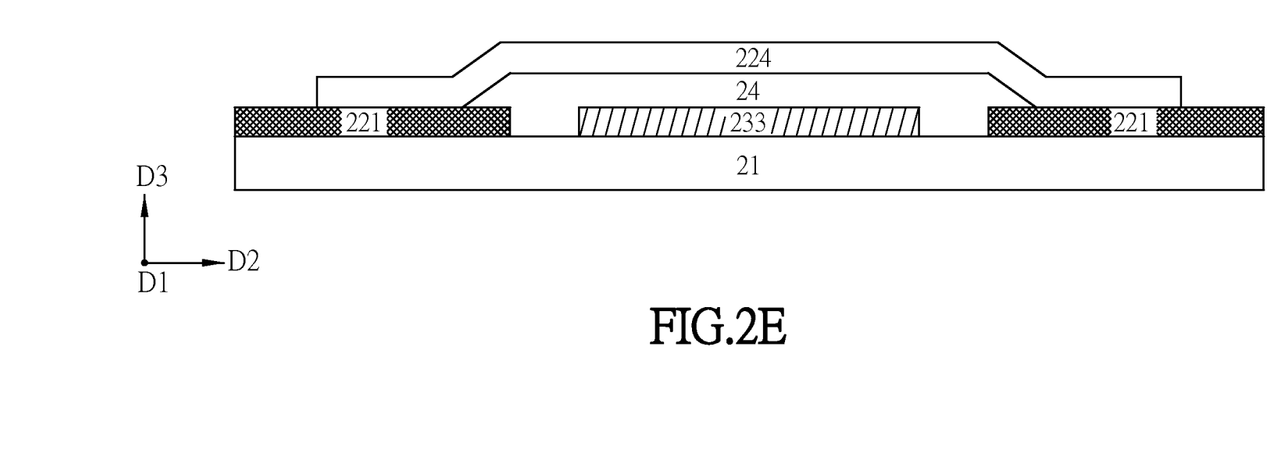
FIG. 2E is a schematic sectional diagram of the touch substrate taken along the line A-A in FIG. 2C.

FIG. 2A is a schematic diagram of a touch display device 9, FIG. 2B is a schematic side view of the touch display device 9 of FIG. 2A, FIG. 2C is a schematic top view of the touch substrate 2 of the touch display device 9 of FIG. 2B, FIG. 2D is a schematic enlarged diagram of a part of FIG. 2C, and FIG. 2E is a schematic sectional diagram of the touch substrate 2 taken along the line A-A in FIG. 2C.

The touch substrate 2 can be applied to an out-cell or an on-cell touch display device, and the former case is given as an example here. The touch display device 9 is, for example but not limited to, a smart phone. In other embodiments, the touch display device 9 also can be a tablet computer, an ultrabook computer, a GPS device or other touch electronic devices. For the convenient illustration, the following embodiments show a first direction D1, a second direction D2 and a third direction D3, which are substantially perpendicular to each other. However, this invention is not limited thereto.

As shown in FIGS. 2A and 2B, the touch display device 9 includes a touch substrate 2, an opposite substrate 3 and a liquid crystal layer 4.

The touch substrate 2 and the opposite substrate 3 are disposed oppositely, and the liquid crystal layer 4 is disposed between the touch substrate 2 and the opposite substrate 3. The touch substrate 2 or the opposite substrate 3 can be made by transparent material, and is, for example but not limited to, a glass substrate, a quartz substrate or a plastic substrate. Moreover, the touch display device 9 can further include a thin film transistor (TFT) array and a color filter (CF) array (not shown). The TFT array is disposed on the opposite substrate 3 and the CF array can be disposed on the touch substrate 2 or the opposite substrate 3. Herein for example, the TFT array is disposed on the side of the opposite substrate 3 facing the touch substrate 2 and the CF array is disposed on the side of the touch substrate 2 facing the opposite substrate 3. In other embodiments, a black matrix layer or color filter layer of the CF array also can be disposed to the opposite substrate 3 so that the opposite substrate 3 can become a BOA (BM on array) substrate or a COA (color filter on array) substrate. However, this invention is not limited thereto. Besides, the touch display device 9 can further include a backlight module (not shown), which is disposed on the side of the opposite substrate 3 away from the touch substrate 2. When the light emitted by the backlight module passes through the opposite substrate 3, the TFT array, the liquid crystal layer 4, the CF array and the touch substrate 2, the images can be formed and displayed by a plurality of pixels.

As shown in FIGS. 2C and 2D, the touch substrate 2 includes a substrate 21, a plurality of first touch patterns 22 and a plurality of second touch patterns 23.

In this embodiment, the first touch patterns 22, the second touch patterns 23 and the insulating layers 24 are disposed on the side of the touch substrate 2 away from the opposite substrate 3 (i.e. the upper side of the touch substrate 2). The first touch patterns 22 and the second touch patterns 23 can constitute the touch sensing circuit (including the sensing electrodes Rx and the driving electrodes Tx) and are formed on the outer surface of the touch substrate 2 (a protective substrate may be added on the outside). In this embodiment, the first touch patterns 22 stand for sensing electrodes and the second touch patterns 23 stand for driving electrodes, for example. In other embodiments, the first touch patterns 22 also can stand for driving electrodes while the second touch patterns 23 stand for sensing electrodes. The first touch patterns 22 and second touch patterns 23 can be made, for example, by transparent conductive material such as ITO, IZO, AZO, CTO, $SnO_2$ or ZnO, or metal material. Moreover, the insulating layer 24 can be made by SiOx, SiNx or other material for example.

The first touch patterns 22 are separated from each other and disposed on the substrate 21 along the first direction D1, and the second touch patterns 23 are separated from each other and disposed on the substrate 21 along the second direction D2. The first touch patterns 22 and the second touch patterns 23 are disposed to interlace with one another. One of the first touch patterns 22 includes a plurality of first main portions 221, a plurality of branch portions 222 and a plurality of first protruding portions 223. The first main portions 221 are extended along the second direction D2 and electrically connected with each other. The branch portions 222 are connected with the first main portions 221 and extended along the first direction D1. The first protruding portions 223 are connected with the branch portions 222 and extended along the second direction D2. The first main portions 221 and the first protruding portions 223 are disposed on the two ends of the branch portions 222, and the first main portions 221, the branch portions 222 and the first protruding portions 223 are disposed on the substrate 21.

In this embodiment, as shown in FIG. 2D, each of the first touch patterns 22 includes the first main portions 221 extended along the second direction D2 (also electrically connected with each other), the branch portions 222 connected with the first main portions and extended along the first direction D1 and the first protruding portions 223 connected with the branch portions 222 and extended along the second direction D2. Furthermore, two branch portions 222 are respectively connected to the two ends of each of the first main portions 221 along the first direction D1, and one end of each of the branch portions 222 away from the first main portion 221 is connected to a first protruding portion 223.

The second touch patterns 23 of this embodiment include a plurality of second main portions 231, a plurality of second protruding portions 232 and a plurality of connecting portions 233. The second main portions 231 are extended along the first direction D1 and separated from each other. The second protruding portions 232 protrude from the two sides of the second main portions 231. One of the connecting portions 233 connects the two adjacent second main portions 231, so that the second main portions 231 are electrically connected with each other. In this embodiment, the second main portions 231, the second protruding portions 232 and the connecting portions 233 are disposed on the substrate 21. Herein, the example is given by that each of the second touch patterns 23 includes four second protruding portions 232, wherein two second protruding portions 232 are disposed on the two sides of the second main portion 231 respectively. Furthermore, each of the connecting portions 233 connects the two adjacent second main portions 231, so that the second touch patterns 23 arranged along the first direction D1 are electrically connected to each other but the left and right second touch patterns are electrically insulated from each other. Moreover, the shape of one of the second protruding portions 232 corresponds to the shape of the branch portion 222 of the first touch pattern 22 which is disposed adjacent to the one of the second protruding portions 232. Herein for example, the shape of each of the second protruding portions 232 corresponds to the shape of the adjacent branch portion 222 of the first touch pattern 22. Besides, each of the first protruding portions 223 is disposed between the two adjacent second protruding portions 232.

The first main portions 221 are separated from each other. The first touch patterns 22 further include a plurality of bridge portions 224 and a plurality of insulating layers 24. One of the bridge portions 224 connects the two adjacent first main portions 221, and the insulating layers 24 are disposed between the bridge portions 224 and the second touch patterns 23. As shown in FIG. 2E, the insulating layers 24 are correspondingly disposed on the connecting portions 233, and the bridge portions 224 are correspondingly disposed on the insulating layers 24. Herein for example, an insulating layer 24 is correspondingly disposed on one of the connecting portions 233, and the bridge portion 224 is disposed on the insulating layer 24 to connect the two adjacent first main portions 221 so that the first touch patterns 22 arranged along the second direction D2 can be electrically connected with each other.

In other words, as shown in FIG. 2C, in this embodiment, the first main portions 221, the branch portions 222, the first protruding portions 223 and the bridge portions 224 are connected to form transverse first touch patterns 22; the second main portions 231, the second protruding portions 232 and the connecting portions 233 (not shown in FIG. 2C) are connected to form longitudinal second touch patterns 23. The first touch patterns 22 and the second touch patterns 23 interlace with one another and are electrically insulated from each other. The first main portions 221, the branch portions 222, the first protruding portions 223, the second main portions 231, the second protruding portions 232 and the connecting portions 233 can be on the same layer. Besides, one of the first touch patterns 22 interlaces with the second touch patterns 23 (electrically insulated from each other), and one of the second touch patterns 23 also interlaces with the first touch patterns 22. To be noted, the extending directions of the first touch patterns 22 and second touch patterns 23 in FIG. 2C are substantially perpendicular to each other (the first direction D1 and the second direction D2 are perpendicular to each other), but this invention is not limited thereto. The case can be adjusted according to the application, for example, the included angle between the first direction D1 and the second direction D2 can be an acute angle.

Figure 2F:
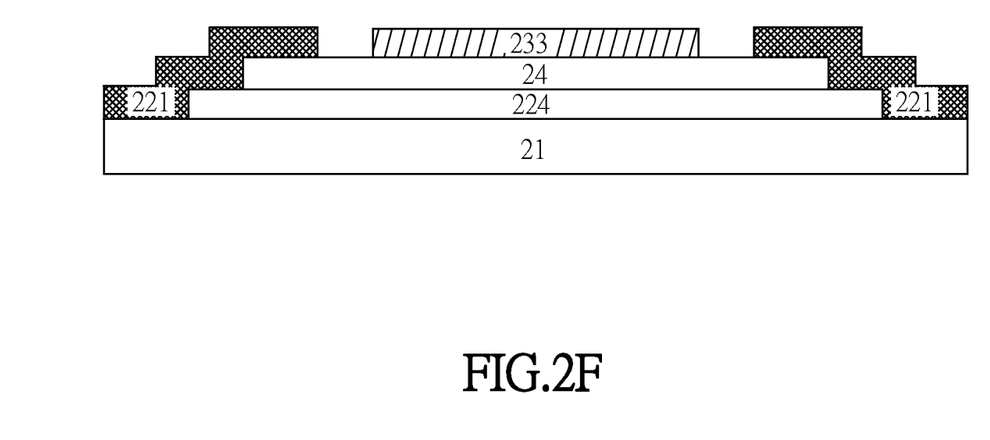
FIG. 2F is a schematic sectional diagram of the touch substrate of another embodiment taken along the line A-A.

However, in another embodiment as shown in FIG. 2F, the bridge portion 224 can be disposed on the substrate 21, then the insulating layer 24 is disposed on the bridge portion 224 and then the two first main portions 221 are respectively disposed on the two sides of the bridge portion 224, so that the bridge portion 224 connects the two first main portions 221. Afterwards, the connecting portion 233 (and the second main portion 231) can be disposed on the insulating layer 24 so that the insulating layer 24 can be disposed between the connecting portion 233 and the bridge portion 224. In other embodiments, the first touch patterns 22 can have no bridge portions 224 and insulating layers 24, and the second touch patterns 23 can have no connecting portions 233. Whereas, the first touch patterns 22 include a plurality of connecting portions (not shown), the second touch patterns 23 include a plurality of bridge portions and a plurality of insulating layers (not shown), and the second main portions 231 of the second touch patterns 23 are separated from each other. In such case, each of the bridge portions connects the two adjacent second main portions 231, and the insulating layers are disposed between the bridge portions and the connecting portions of the first touch patterns so as to insulate the bridge portions from the first touch patterns. However, this invention is not limited thereto.

As shown in FIG. 2D, one of the branch portions 222 includes a middle section C and two extending sections E1, E2. The two extending sections E1, E2 are disposed on the two ends of the middle section C and connected to the corresponding first main portion 221 and first protruding portion 223, respectively, and the minimum width W of the middle section C is less than the minimum width of the two extending sections E1, E2. In this embodiment, each of the branch portions 222 includes a middle section C and two extending sections E1, E2, the two extending sections E1, E2 are respectively disposed on the two ends of the middle section C, and the extending section E1 is connected to the corresponding first main portion 221 while the extending section E2 is connected to the corresponding first protruding portion 223. Herein, the "middle" of the middle section C just shows the relation of the relative position with the extending sections E1, E2, and the middle section C is about located at the central part of the branch portion 222. Besides, the middle section C possesses the minimum width W of the whole branch portion 222 along the second direction D2, and the minimum width of the two extending sections E1, E2 must be greater than the minimum width W of the middle section C, so that the branch portion 222 has a neck-like shape (featuring the narrower middle and wider sides). In other embodiments, the branch portion 222 may include a plurality of neck-like structures.

The shape of one end of each of the first protruding portion 223 and the second protruding portion 232 along the second direction D2 can be taper (such as a taper triangle), rectangular or arc. As shown in FIG. 2D, the opposite ends of the first protruding portion 223 facing the second main portion 231 have a taper triangular shape. However, in other embodiments, the two ends of the first protruding portion 223 facing the second main portions 231 may have a rectangular shape, an arc shape or another shape. Moreover, one end of the second protruding portion 232 facing the branch portion 222 can have a taper shape (such as a taper triangle), a rectangular shape, an arc shape or another shape. In this embodiment, the shape of the second protruding portion 232 corresponds to the shape of the adjacent branch portion 222, and the shape of the first protruding portion 223 corresponds to the adjacent second main portion 231. Herein, the above-mentioned corresponding case can encompass, for example, the match of a protrusion and a depression or a curving structure and another curving structure, or another kind of match. By the shape design of the first touch patterns 22 and second touch patterns 23, the sensing path and range of the touch substrate 2 can be increased.

Figure 2G:
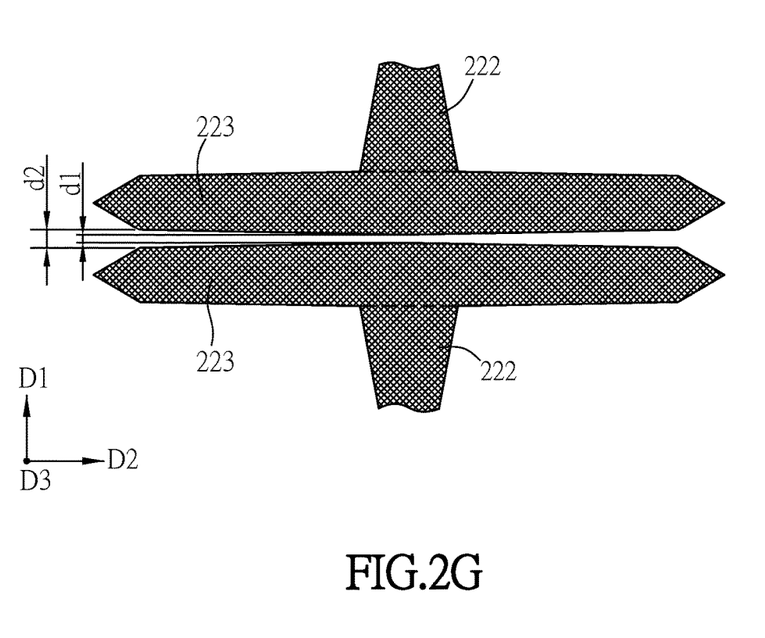
FIG. 2G is another schematic enlarged diagram of a part of FIG. 2C.

Refer to FIG. 2G, which is another schematic enlarged diagram of a part of FIG. 2C. For the adjacent first protruding portions 223 of the adjacent first touch patterns 22, the interval at the middle part is less than that at the each of the end parts. Herein, the adjacent first protruding portions 223 of the adjacent first touch patterns 22 have a first interval d1 near the branch portions 222 and a second interval d2 far from the branch portions 222. Herein, the second interval d2 is the interval between the end parts, the farthest from the branch portions 222, of the two opposite first protruding portions 223, and the first interval d1 is the interval between the two opposite first protruding portions 223 at the middle part of the two opposite first protruding portions 223 (i.e. the interval at the location closest to the branch portions 222). The second interval d2 is greater than the first interval d1. By such structure design, the interval between the two adjacent first protruding portions 223 along the second direction D2 has a gradual variation (the wider outer side and the narrower inner side). Thereby, overmuch charge accumulation and coupling can be prevented from being formed on the ends of the opposite first protruding portions 223, and therefore the sensing sensitivity of the touch substrate 2 won't be affected.

Accordingly, in the touch substrate 2 of this embodiment, the first touch patterns 22 and the second touch patterns 23 are designed in the shape and arrangement, the branch portion 222 of the first touch pattern 22 includes a middle section C and two extending sections E1, E2, the two extending sections E1, E2 are disposed on the two ends of the middle section C and connected with the corresponding first main portion 221 and first protruding portion 223, respectively, and the minimum width of the middle section C is less than that of the two extending sections E1, E2. Therefore, in comparison with the touch pattern of the conventional touch substrate, the sensing path and range can be extended between the first touch patterns 22 and second touch patterns 23 of the touch substrate 2, and the sensing sensitivity can be thus enhanced.

FIGS. 3A to 3D are schematic partial enlarged diagrams of the touch substrates 2a~2d according to different embodiments of the invention.

Figure 3A:
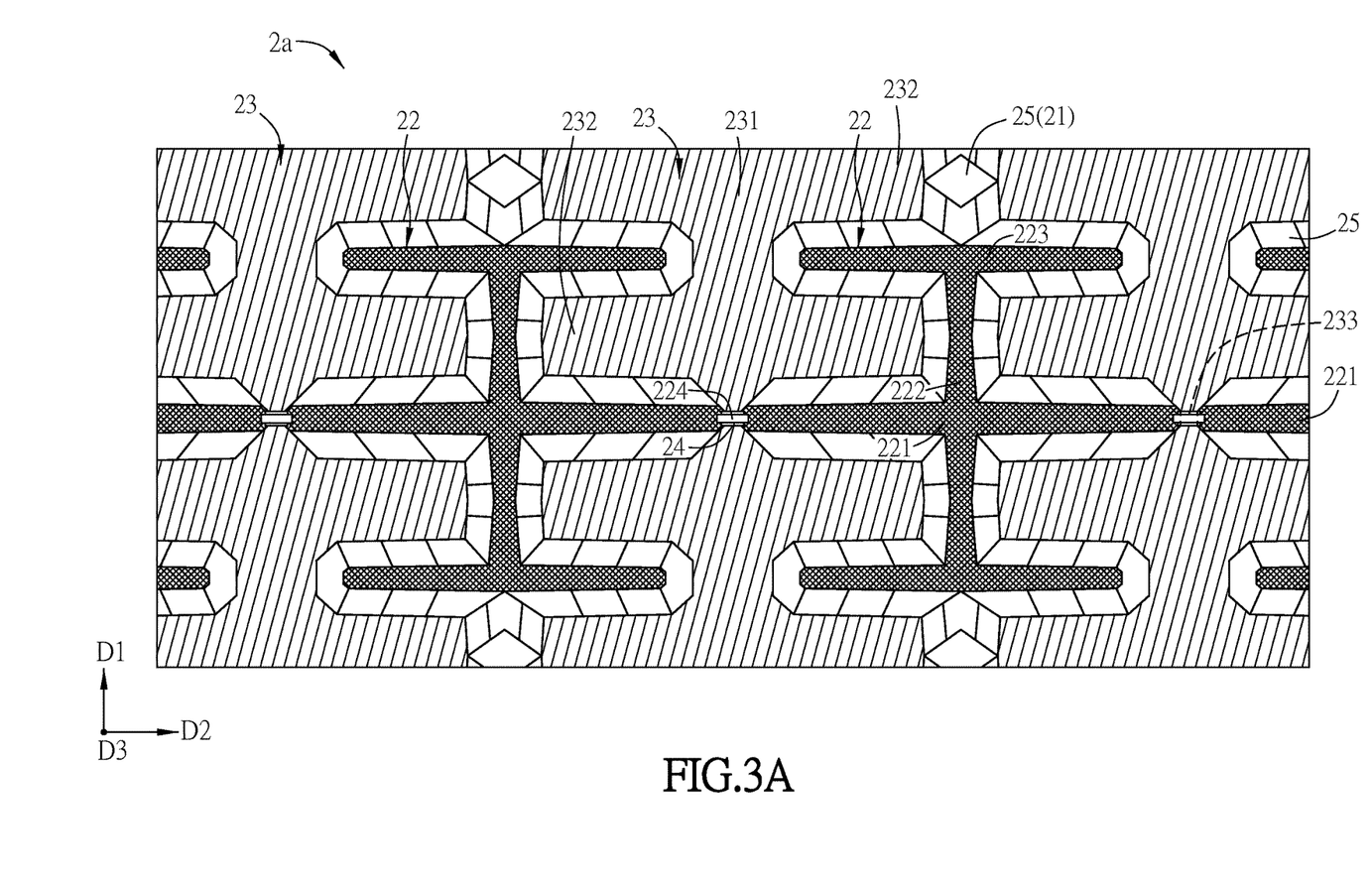
FIGS. 3A to 3D are schematic partial enlarged diagrams of the touch substrates according to different embodiments of the invention.

As shown in FIG. 3A, the main difference from the touch substrate 2 of FIG. 2D will be illustrated below. In the touch substrate 2a, the two ends of the first protruding portion 223 along the second direction D2 don't have a sharp shape but a blunt shape (like an arc shape), and one end of the second protruding portion 232 facing the branch portion 222 also has an arc shape. Besides, the touch substrate 2a further includes a plurality of dummy electrodes 25, which are disposed between the first touch patterns 22 and the second touch patterns 23. Thereby, the refractive index between the first touch patterns 22 and the second touch patterns 23 (i.e. the refractive index of the slit) will be closer to that of the first touch pattern 22 or second touch pattern 23, and therefore the touch substrate 2a can have a better visuality.

Figure 3B:
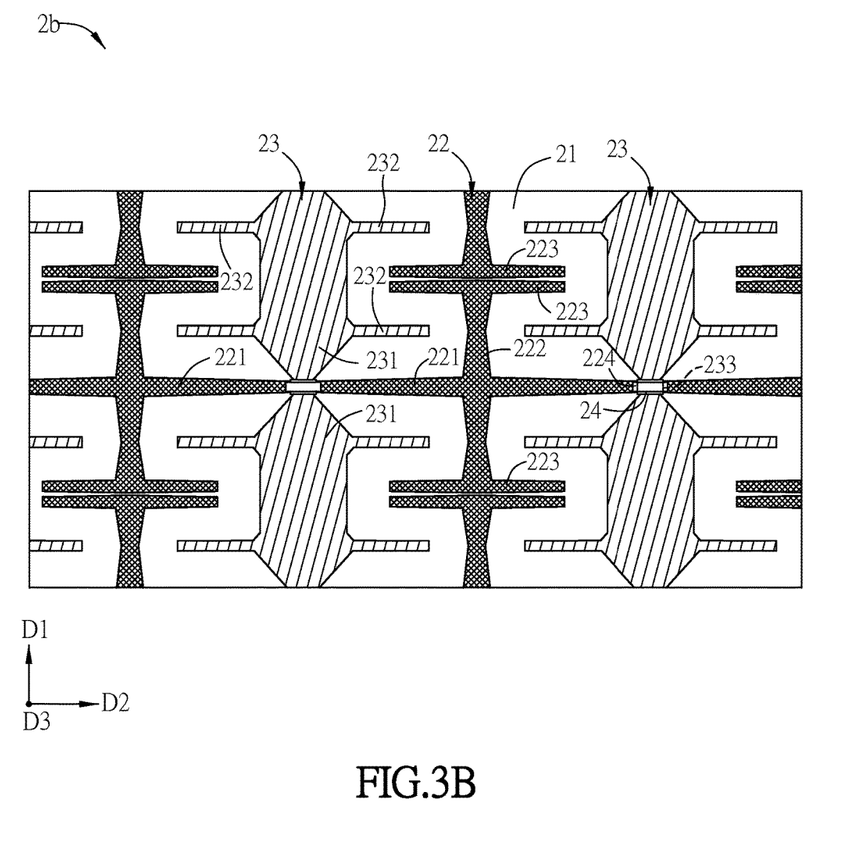

As shown in FIG. 3B, the main difference from the touch substrate 2 of FIG. 2D is that the second main portion 231 of the touch substrate 2b has a different shape from the second main portion of the touch substrate 2, and the second protruding portion 232 of this embodiment is also longer.

Figure 3C:
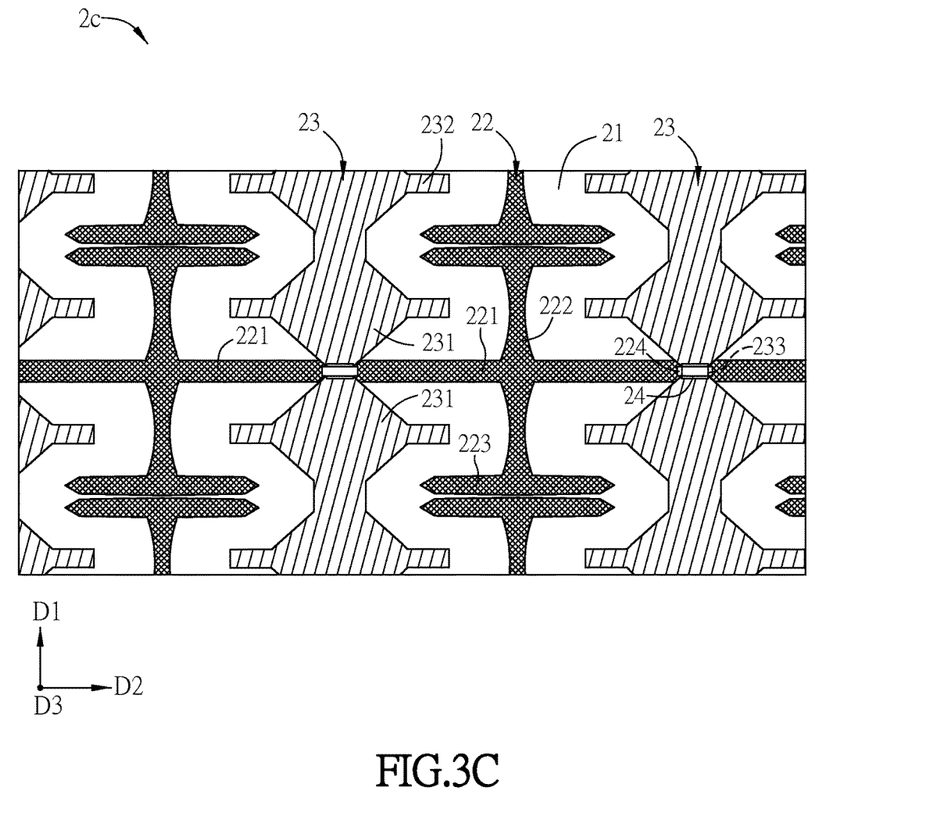

As shown in FIG. 3C, the main difference from the touch substrate 2 of FIG. 2D is that the two sides of the branch portion 222 of the first touch pattern 22 of the touch substrate 2c along the second direction D2 are curvingly concaved.

Figure 3D:
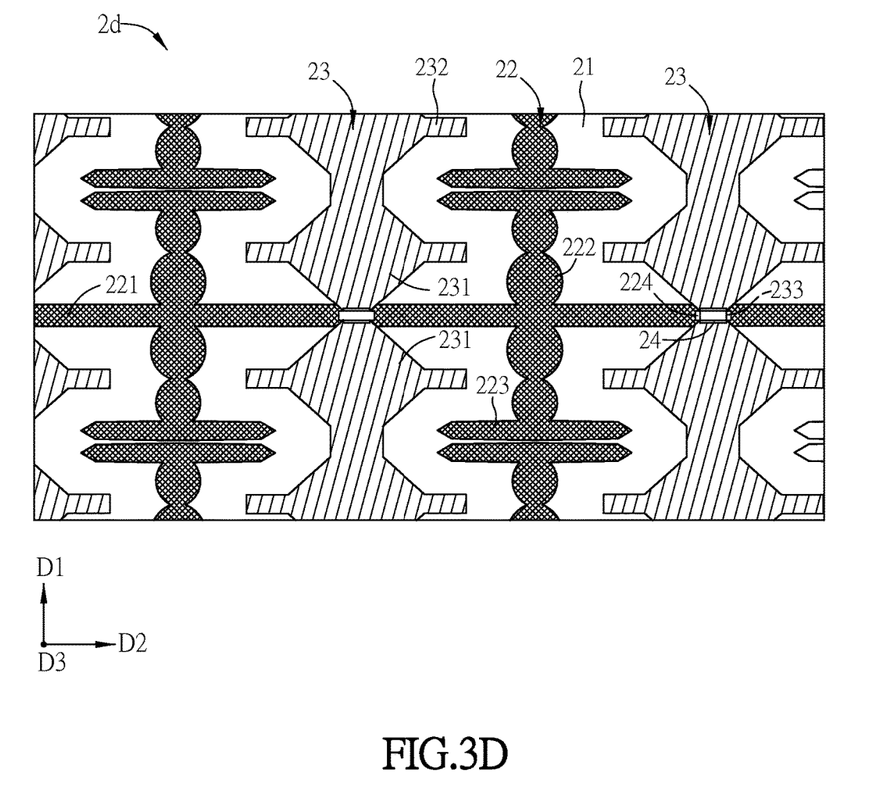

As shown in FIG. 3D, the main difference from the touch substrate 2 of FIG. 2D is that the branch portion 222 of the first touch pattern 22 of the touch substrate 2d has a gourd shape (the middle section thereof also possesses the minimum width along the second direction D2).

Other technical features of the touch substrates 2a~2d can be comprehended by referring to the touch substrate 2 and therefore the related descriptions are omitted here for conciseness.

To be noted, the shapes of the first touch pattern 22 and second touch pattern 23 of the touch substrates 2, 2a~2d are just for the illustrative purpose but not for limiting the scope of the invention. Besides, in different embodiments, the touch substrate 2 of FIG. 2B can be replaced by one of the touch substrates 2a~2d to bring out a different touch display device.

Figure 4:
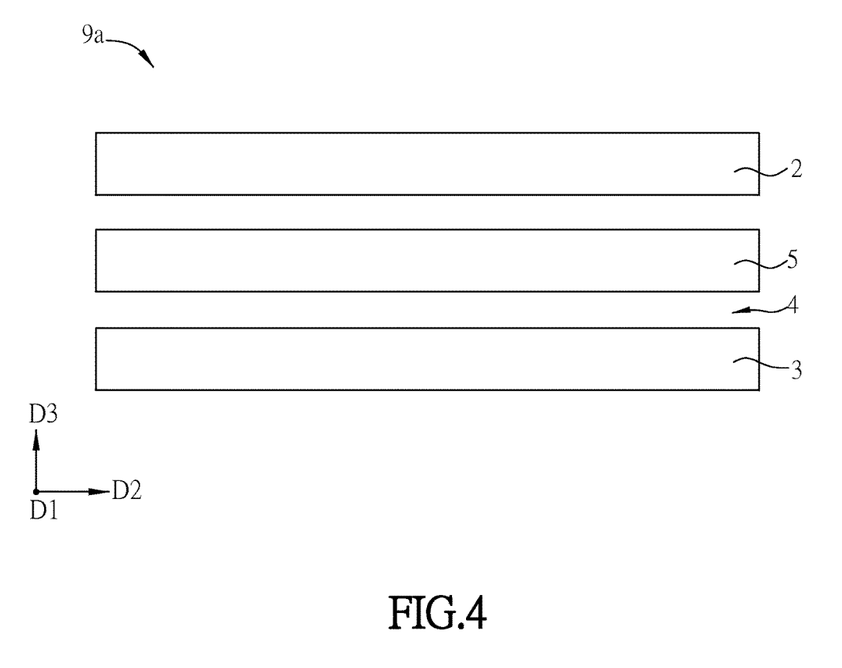
FIG. 4 is a schematic sectional diagram of a touch display device of another embodiment of the invention.

FIG. 4 is a schematic sectional diagram of a touch display device 9a of another embodiment of the invention.

As shown in FIG. 4, the main difference from the touch display device 9 will be illustrated below. The touch display device 9a can further include another substrate 5 disposed between the touch substrate 2 and the opposite substrate 3, and the liquid crystal layer 4 is disposed between the opposite substrate 3 and the substrate 5. The touch pattern (not shown) formed by the first touch patterns 22, the second touch patterns 23 and the insulating layers 24 is disposed on the side of the touch substrate 2 facing the substrate 5. The touch display device 9a of this embodiment is an out-cell touch display device. The substrate 21 of the touch substrate 2 (or one of 2a~2d) is a glass substrate for example, and the touch pattern can be directly formed on the inner surface of the substrate 21 facing the substrate 5. Moreover, for example, the substrate 5 is a CF substrate including a CF array, and the opposite substrate 3 is a TFT substrate including a TFT array. In this embodiment, the substrate 21 is a cover lens. In other embodiments, another protective substrate may be added on the substrate 21.

Other technical features of the touch display device 9a can be comprehended by referring to the touch display device 9 and therefore the related descriptions are omitted here for conciseness.

Summarily, in the touch substrate of this invention, the first touch patterns and the second touch patterns are designed in the shape and arrangement, one of the branch portions of the first touch patterns includes a middle section and two extending sections, the two extending sections are disposed on the two ends of the middle section and connected with the corresponding first main portion and first protruding portion, respectively, and the minimum width of the middle section is less than that of the two extending sections. Therefore, in comparison with the touch pattern of the conventional touch substrate, the sensing path and range can be extended between the first touch patterns and second touch patterns of the touch substrate of the invention, and the sensing sensitivity can be thus enhanced.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A touch substrate, comprising:
a substrate;
a plurality of first touch patterns separated from each other and disposed on the substrate along a first direction; and
a plurality of second touch patterns separated from each other and disposed on the substrate along a second direction, wherein the first touch patterns and the second touch patterns interlace with one another,
wherein one of the first touch patterns includes a plurality of first main portions, a plurality of branch portions and a plurality of first protruding portions, the first main portions are extended along the second direction and electrically connected to each other, the branch portions are connected to the first main portions and extended along the first direction, the first protruding portions are connected to the branch portions and extended along the second direction, the first main portions and the first protruding portions are respectively disposed on two ends of one of the branch portions, the one of the branch portions includes a middle section and two extending sections, the two extending sections are disposed on two ends of the middle section and connected to the corresponding first main portion and first protruding portion, respectively, and the minimum width of the middle section is less than that of the two extending sections.

2. The touch substrate as recited in claim 1, wherein the second touch patterns include a plurality of second main portions and a plurality of second protruding portions, the second main portions are extended along the first direction and electrically connected to each other, the second protruding portions protrude from the second main portions, and the shape of one of the second protruding portions corresponds to the shape of the branch portion of the first touch pattern which is disposed adjacent to the one of the second protruding portions.

3. The touch substrate as recited in claim 2, wherein the shape of one end of each of the first protruding portion and the second protruding portion is taper, rectangular or arc.

4. The touch substrate as recited in claim 2, wherein the second main portions are separated from each other, the second touch patterns further include a plurality of bridge portions and a plurality of insulating layers, one of the bridge portions connects the two adjacent second main portions, and the insulating layers are disposed between the bridge portions and the first touch patterns.

5. The touch substrate as recited in claim 2, wherein the shape of one of the first protruding portions corresponds to the shape of the second main portion which is disposed adjacent to the one of the first protruding portions.

6. The touch substrate as recited in claim 5, wherein the one of first protruding portions is disposed between the adjacent second protruding portions.

7. The touch substrate as recited in claim 1, wherein the interval between the adjacent first protruding portions of the adjacent first touch patterns at a middle part of the adjacent first protruding portions is less than that at an end part of the adjacent first protruding portions.

8. The touch substrate as recited in claim 1, wherein the first main portions are separated from each other, the first touch patterns further include a plurality of bridge portions and a plurality of insulating layers, one of the bridge portions connects the two adjacent first main portions, and the insulating layers are disposed between the bridge portions and the second touch patterns.

9. The touch substrate as recited in claim 1, further comprising:
a plurality of dummy electrodes disposed between the first touch patterns and the second touch patterns.

10. The touch substrate as recited in claim 1, which is applied to an out-cell touch display device or an on-cell touch display device.

* * * * *